United States Patent Office 3,314,951
Patented Apr. 18, 1967

3,314,951
SPIRO(INDOLINE-3,2'-[2H-1,3]THIAZIN)-2-ONES AND DERIVATIVES THEREOF
Milton Wolf, West Chester, Pa., assignor to American Home Products Corporation, New York, N.Y., a corporation of Delaware
No Drawing. Filed Mar. 24, 1964, Ser. No. 354,456
13 Claims. (Cl. 260—243)

The invention herein disclosed is concerned with compositions of matter classified in the art of chemistry as spiro(indoline-thiazines), to the derivatives thereof and to the process for making these compounds.

The invention sought to be patented in its principal composition aspect is described as residing in the concept of a chemical compound having a 3',4',5',6'-tetrahydrospiro(indoline-3,2'-[2H1,3]thiazin)-2-one structure.

The tangible embodiments of the composition aspects of this invention possess the inherent physical properties of being relatively high melting colorless solids which are soluble in polar solvents. They are relatively insoluble in water. Examination of compounds produced according to the hereinafter described process reveals data confirming the molecular structure herein before described. For example, the presence of the spiro configuration is clearly evident as is the presence of C=O in certain 2-one derivatives of the spiro(indoline-thiazines). The aforementioned physical characteristics taken with the known structures of the starting materials and the preparatory method utilized, positively confirm the structure of the composition sought to be patented.

The tangible embodiment of the composition aspects of this invention possesses the inherent applied use characteristics of exerting qualitatively varying therapeutic effects as evidenced by pharmaceutical evaluation according to standard test procedures. These tangible embodiments show anti-inflammatory and anticonvulsant properties and effects. These findings indicate their usefulness in the treatment of inflammation and convulsions. In addition, the tangible embodiments of the composition aspects of this invention also demonstrate analgesic and cardiovascular activity.

In addition to their inherent applied use characteristics, the intermediate compositions of this invention are useful in practicing the process aspect of the present invention in the making of the 3'-substituted spiro(indoline-thiazines).

The invention sought to be patented in a principal process of making the compositions aspect is described as residing in the concept of condensing isatin(or an indole-2,3-dione) with a 3-mercaptopropylamine or an acid sale thereof to form a 3',4',5',6'-tetrahydrospiro(indoline-3,2'-[2H-1,3]thiazin)-2-one.

The invention sought to be patented in a sub generic composition aspect is described as residing in the concept of a chemical compound having a spiro(indoline-thiazin)-2-one structure in which the hydrogen at the 3' position of the thiazine ring has been displaced in a substitution reaction.

The composition sought to be patented in said second composition aspect possesses the applied use characteristic of exerting analgesic effects as evidenced by standard test procedures.

Referring now to the reaction sequence below, the reaction involved in the synthesis of a specific embodiment, namely DL-3'-carbamoyl-3',4',5',6'-tetrahydrospiro(indoline-3,2'-[2H-1,3]thiazin)-2-one is illustrated:

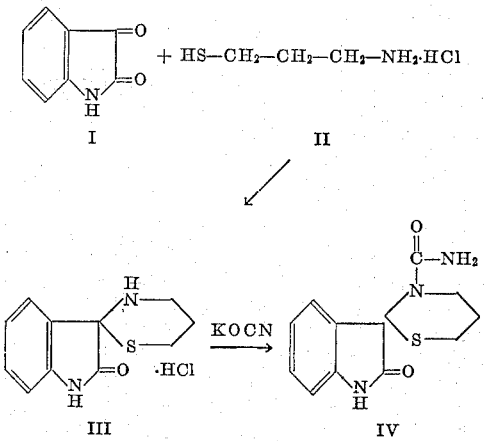

Isatin (I) is reacted with 3-mercaptopropylamine hydrochloride (II) in the presence of an inert solvent under reflux during which a solvent water azeotrope is removed. A colorless solid separates during reflux, which is recovered by filtration. Recrystallization of the crude product affords 3',4',5',6'-tetrahydrospiro(indoline-3,2'-[2H-1,3]thiazin)-2-one III. Reacting the product III with potassium cyanate effects a substitution at the 3' position of the thiazine ring, forming the specific embodiment IV, DL - 3'-carbamoyl-3',4',5',6'-tetrahydrospiro(indoline-3,2-[2H-1,3]thiazine)-2-one.

The starting material isatin utilized in the method of the present invention is known or may be prepared according to methods known in the art. A full description of the preparation of isatin is given in Organic Synthesis Coll., vol. I, pages 327–330 (1932). The method described in detail therein is based on the work of Sandmeyer, Helvetica Chim. Acta 2, 237, 239 (1919). According to this method, chloral hydrate, aniline and hydroxylamine are reacted to produce an isonitrosoacetanilide which one treatment with conc. $H_2SO_4$ yields the desired isatin. The substituted isatin starting materials are obtainable according to this reaction utilizing the appropriate aniline derivative.

The mercaptopropylamines are also known in the art or may be prepared according to methods taught in the art from primary amines such as methylamine, phenylamine and the like. For example, U.S. 2,401,234, May 28, 1946, describes a method of preparing alkylamino alkanethiols in which a gamma-chloropropanethiol acetate is reacted with diethylamine under pressure to produce after removal of diethylamine hydrochloride a mixture of N,N-diethylacetamide and gamma-diethylaminopropanethiol. Separation of the mixture yields the desired starting mercaptopropylamine. Suitably substituted propylthiolacetates or equivalents will provide the final mercaptopropylamine product with the desired substituents.

As will be apparent by reference to the reaction sequence above, certain variants of the starting materials can be employed to perform the process of this invention. It will be apparent that in place of the hydrogen at the 1-position of the isatin other substituents can be present such as lower alkyl, ethyl, propyl, isopropyl or butyl; aralkyl such as $C_6H_5$—$CH_2$; aryl, $C_6H_5$; dialkylaminoalkyl, such as dimethylamino ethyl; and acyl such as CH₃CO or p-ClC₆H₄CO. When such starting materials are employed in the processes of this invention, these will be formed spiro (indoline-thiazine) bearing the corresponding, alkyl, aryl, alkaryl, dialkylaminoalkyl and acyl groups in the 1-position thereof. Furthermore, by starting with a 4,5,6 or 7-substituted isatin, a spiro(indoline-thiazine) is obtained which is correspondingly substituted in the 4,5,6 and 7-positions thereof. In addition to the substituents identified at the 1-position, the positions at 4,5,6 or 7 may include halogen, hydroxy, nitro, lower alkoxy, alkoxycarbonyl, amino, carboxamido and acylamido. In the present invention, such compounds are the full equivalents of the starting isatin compound and the processes utilizing such starting materials are the full equivalents of processes starting with isatin.

In the process we may use variants of the 3-mercaptopropylamine or acid salt thereof in condensing the latter with isatin. Such variants would include substituents such as alkyl, ethyl propyl, or butyl at the 1, 2 and 3 position of the 3-mercaptopropylamine salt. In place of the alkyl group there can be other groups such as aralkyl, aryl and heterocyclic groups such as 2-thienyl, morpholino, pyrrolidino and piperazino. When the variant includes a heterocyclic of the type described, the variant will generally contain only one such group at the 1, 2 or 3 position, with the remaining positions generally being unsubstituted. 3-mercaptopropylamines are the full equivalents of 3-mercaptopropylamine hydrochloride, and processes utilizing such 3-mercaptopropylamine hydrohalides are the full equivalents of using the unsubstituted compound.

Conversion of the 3',4',5',6'-tetrahydrospiro(indoline-3,2'-[2H-1,3]thiazin)-2-one to the 3' substituted spiro (indoline-3,2'-[2H-1,3]thiazin)-2-one by the displacement of hydrogen at the 3'-position is accomplished by a suitable acylating or alkylating agent as well as the KOCN shown. An acylating agent such as acetic anhydride or an alkylating agent such as methyl iodide or benzyl bromide with suitable catalyst may be used. Such agents are the full equivalents of the KOCN used above and processes utilizing such agents are the full equivalents of processes utilizing KOCN.

When utilized in a manner to obtain the benefit of the various composition aspects of the present invention, it will be apparent that embodiments of the composition aspect in various forms, particularly adapted for the desired utilization, may be employed. These embodiments include without limitation by the recitation thereof a specified compound in admixture with a pharmaceutically administrable organic or inorganic carrier, such that the composition is suitable for enteral or parenteral administration. The composition may be prepared in solid form, such as in tablets, or in liquid form such as a solution, suspension or emulsion. Suitable liquid carriers include water, gelatin, lactose, starch, talc, vegetable oils alcohols, polyalcohols, gums, USP syrups and the like. The pharmaceutical composition in addition to the active principle and the carrier may include auxiliary materials such as coloring stabilizing, wetting or emulsifying agents. It is of course recognized as essential that the carrier as well as any other materials present with the active principle be inert with respect thereto.

The following examples set forth the best mode contemplated by the inventor of carrying out the invention:

*Example I.—DL-3',4',5',6'-tetrahydrospiro(indoline-3,2'-[2H-1,3]thiazin)-2-one hydrochloride*

A mixture of isatin (14.7 g., 0.10 m.) and 3-mercaptopropylamine hydrochloride (13.3 g. of 96.2%, 0.10 m.) in absolute ethanol (125 ml.) is refluxed under a take-off condenser and a total of 50 ml. of distillate (ethanol-water azeotrope) collected. The colorless solid which separates during the reflux period (ca. one-half hour) is collected by filtration, washed with absolute ethanol, dried at 50° C./house vac.; yield, 20.6 g. (80.2%) of 3',4',5',6'-tetrahydrospiro(indoline - 3,2'-[2H-1,3]thiazin)-2-one hydrochloride, M.P. 223° C. dec. (uncorr.). Concentration of the filtrate gives a second crop, 2.4 g. (9.4%), M.P. 220° C. dec. (uncorr.). Total yield, 23.0 g. (89.6%). Recrystallization of the crude product from methanol-ethanol affords 12.0 g. (46.7% of colorless needles, M.P. 231° C. dec. (uncorr.); a second crop, 3.6 g. (14.0%), M.P. 231° C. dec. (uncorr.) is obtained on concentrating the filtrate.

Total yield, 15.6 g. (60.7%).

*Analysis.*—Calcd. for $C_{11}H_{13}ClN_2OS$: C, 51.46; H, 5.10; N, 10.91; Cl, 13.81. Found: C, 51.56; H, 4.98; N, 10.82; Cl, 14.0.

*Example II.—DL-3'-carbamoyl-3',4',5',6'-tetrahydrospiro (indoline-3,2'-[2H-1,3]thiazin)-2-one*

Potassium cyanate (0.81 g., 0.010 m.) is added with stirring to a solution of 3',4',5',6'-tetrahydrospiro(indoline-3,2'-[2H-1,3-]thiazin)-2-one hydrochloride (2.57 g., 0.010 m.) in distilled water (30 ml.) and tetrahydrofuran (10 ml.). After ca. one-half minute, a colorless solid separates. After one hour storage at room temperature, the mixture is diluted with water (50 ml.) and the colorless solid collected by filtration, washed with water, dried at 70° C./house vac.; yield, 2.00 g. (76.0%), M.P. 192° C. dec. (uncorr.). Recrystallization from dimethylformamide-water (Darco G–60) yields 1.10 g. of colorless prisms, M.P. 209° C. dec. (uncorr.).

*Analysis.*—Calcd. for $C_{12}H_{13}N_3O_2S$: C, 54.73; H, 4.97; N, 15.96. Found: C, 54.68; H, 5.03; N, 15.92.

*Example III.—DL-5-methyl-3',4',5',6'-tetrahydrospiro(indoline-3,2'-[2H-1,3]thiazin)-2-one hydrochloride*

The reaction of 5-methylisatin (8.05 g., 0.050 m.) with 3-mercaptopropylamine hydrochloride (6.63 g. of 96.2%, 0.050 m.) in a manner similar to that of Example I gives the title compound (5.7 g., 42.1%), M.P. 227° C. dec. (uncorr.).

*Analysis.*—Calcd. for $C_{12}H_{15}ClN_2OS$: C, 52.22; H, 5.58; N, 10.35. Found: C, 53.32; H, 5.67; N, 10.18.

*Example IV.—DL-5-bromo-3',4',5',6'-tetrahydrospiro (indoline-3,2'-[2H-1,3]thiazin)-2-one hydrochloride*

The reaction of 5-bromoisatin (11.3 g., 0.050 m.) with 3-mercaptopropylamine hydrochloride (6.63 g. of 96.2%, 0.050 m.) in a manner similar to that of Example I gives the title compound (7.1 g. 42.3%), colorless prisms, M.P. 226.5° C. dec. (uncorr.).

*Analysis.*—Calcd. for $C_{11}H_{12}BrClN_2OS$: C, 39.36; H, 3.60; N, 8.35. Found: C, 39.34; H, 4.04; N, 8.26.

*Example V.—DL-5,7-dichloro-3',4',5',6'-tetrahydrospiro (indoline-3,2'-[2H-1,3]thiazin)-2-one hydrochloride*

The reaction of 5,7-dichloroisatin (10.80 g., 0.050 m.) with 3-mercaptopropylamine hydrochloride (6.63 g. of 96.2%, 0.050 m.) in a manner similar to that of Example I yields the title compound (9.9 g., 60.7%), colorless needles, M.P. 240° C. dec. (uncorr.).

*Analysis.* — Calcd. for $C_{11}H_{11}Cl_3N_2OS$: C, 40.58; H, 3.40; N, 8.60; Cl, 32.66. Found: C, 40.84; H, 3.41; N, 8.82; Cl, 32.38.

*Example VI.—DL-1-methyl-3',4',5',6'-tetrahydrospiro (indoline-3,2'-[2H-1,3]thiazin)-2-one hydrochloride*

The reaction of 1-methylisatin (8.05 g., 0.050 m.) with 3-mercaptopropylamine hydrochloride (6.63 g. of 96.2%) (0.050 m.) in a manner similar to that of Example I yields the title compound (8.2 g., 60.5 g.), M.P. 218° C., dec. (uncorr.).

*Analysis.*—Calcd. for $C_{12}H_{15}ClN_2OS$: C, 53.22; H, 5.58; N, 10.35. Found: C, 53.25; H, 5.39; N, 10.10.

*Example VII.—DL - 5 - bromo-1-methyl-3',4',5',6'-tetrahydrospiro(indoline - 3,2' - [2H - 1,3]thiazin) - 2-one hydrochloride*

The reaction of 5-bromo-1 methylisatin (4.80 g., 0.020 m.) with 3-mercaptopropylamine hydrochloride (2.65 g. of 96.2%, 0.020 m.) in a manner similar to that of Example I yields the title compound.

*Example VIII.—DL - 5,7 - dichloro - 1 - methyl - 3',4',5', 6' - tetrahydrospiro(indoline - 3,2' - [2H - 1,3]thiazin) 2-one hydrochloride*

The reaction of 5,7-dichloro-1-methylisatin (4.50 g., 0.020 m.) with 3-mercaptopropylamine hydrochloride (2.65 g. of 96.2%, 0.050 m.) in a manner similar to that of Example I yields the title compound.

Analysis.—Calcd. for $C_{12}H_{13}Cl_3N_2OS$: C, 42.43; H, 3.86; N, 8.25. Found: C, 42.72; H, 4.02; N, 8.15.

*Example IX.—DL - 1 - phenyl - 3',4',5',6' - tetrahydrospiro(indoline-3,2' - [2H - 1,3]-thiazin) - 2 - one hydrochloride*

The reaction of 1-phenylisatin (4.468 g., 0.020 m.) with 3-mercaptopropylamine hydrochloride (2.65 g., 0.020 m.) in a manner similar to that of Example I yields the title compounnd (2.30 g., 34.5%), colorless needles, M.P. 309° C. dec. (uncorr.).

Analysis.—Calcd. for $C_{17}H_{17}ClN_2OS$: C, 61.34; H, 5.75; N, 8.41. Found: C, 60.81; H, 5.25; N, 8.00.

*Example X.—DL - 5 - nitro - 3',4',5',6' - tetrahydrospiro (indoline - 3,2' - [2H - 1,3]thiazin) - 2 - one hydrochloride*

The reaction of 5-nitroisatin (9.60 g., 0.050 m.) with 3-mercaptopropylamine hydrochloride (6.63 g. of 96.2%, 0.050 m.) in a manner similar to that of Example I yields the title compound.

*Example XI.—DL - 1,5 - dimethyl - 3',4',5',6' - tetrahydrospiro(indoline - 3,2' - [2H - 1,3]thiazin) - 2-one hydrochloride*

The reaction of 1,5-dimethylisatin (3.50 g., 0.020 m.) with 3-mercaptopropylamine (2.65 g. of 96.2%, 0.020 m.) in a manner similar to that of Example I, gives the title compound (5.4 g., 94.7%), M.P. 208° C. dec. (uncorr.).

Analysis.—Calcd. for $C_{13}H_{17}ClN_2OS$: C, 54.82; H, 6.01; N, 9.84. Found: C, 54.88; H, 5.92; N, 10.19.

*Example XII.—DL - 5 - iodo - 3',4',5',6' - tetrahydrospiro(indoline - 3,2' - [2H - 1,3] - thiazin) - 2 - one hydrochloride*

The reaction of 5-iodoisatin (8.19 g., 0.030 m.) with 3-mercaptopropylamine hydrochloride (3.98 g. of 96.2%, 0.030 m.) in a manner similar to that of Example I, yields the title compound (4.7 g., 40.9%), M.P. 223° C. dec. (uncorr.).

Analysis.—Calcd. for $C_{11}H_{12}ClIN_2OS$: C, 34.52; H, 3.16; N, 7.32. Found: C, 34.76; H, 3.27; N, 6.89.

*Example XIII.—DL - 7 - chloro - 3',4',5',6' - tetrahydrospiro(indoline - 3,2' - [2H - 1,3] - thiazin) - 2 - one hydrochloride*

The reaction of 7-chloroisatin (5.45 g., 0.030 m.) with 3-mercaptopropylamine hydrochloride (3.98 g. of 96.2%, 0.030 m.) in a manner similar to that of Example I, affords the title compound (2.00 g., 22.9%), colorless needles, M.P. 234° C. dec. (uncorr.).

Analysis.—Calcd. for $C_{11}H_{12}Cl_2N_2OS$: C, 45.37; H, 4.16; N, 9.62. Found: C, 45.45; H, 3.98; N, 9.88.

*Example XIV.—DL - 5 - fluoro - 3',4',5',6' - tetrahydrospiro(indoline - 3,2' - [2H - 1,3] - thiazin) - 2 - one hydrochloride*

The reaction of 5-fluoroisatin (10.00 g., 0.0605 m.) with 3-mercaptopropylamine hydrochloride (8.20 g. of 96.2%, 0.062 m.) in a manner similar to that of Example I, gives the title compound (10.4 g., 62.7%) colorless needles, M.P. 228° C. dec. (uncorr.).

Analysis.—Calcd. for $C_{11}H_{12}ClFN_2OS$: C, 48.08; H, 4.40; N, 10.20; Cl, 12.91. Found: C, 48.02; H, 4.28; N, 10.44; Cl, 13.2.

*Example XV.—DL - 4 - chloro - 3',4',5',6' - tetrahydrospiro(indoline - 3,2' - [2H - 1,3] - thiazin) - 2 - one hydrochloride*

The reaction of 4-chloroisatin (3.64 g., 0.020 m.) with 3-mercaptopropylamine hydrochloride (2.92 g. of 96.2%, 0.022 m.) in a manner similar to that of Example I, yields the title compound (3.50 g., 60.1%), colorless prisms, M.P. 235° C. dec. (uncorr.).

Analysis.—Calcd. for $C_{11}H_{12}Cl_2N_2OS$: C, 45.37; H, 4.16; N, 9.62; Cl, 24.35. Found: C, 45.57; H, 4.14; N, 9.75; Cl, 24.4.

*Example XVI.—DL - 6 - chloro - 3',4',5',6' - tetrahydrospiro(indoline - 3,2' - [2H - 1,3] - thiazin) - 2 - one hydrochloride*

The reaction of 6-chloroisatin (3.64 g., 0.020 m.) with 3-mercaptopropylamine (2.92 g. of 96.2%, 0.022 m.) in a manner similar to that of Example I, affords the title compound (4.1 g., 70.4%), colorless prisms, M.P. >320° C. (uncorr.).

Analysis.—Calcd. for $C_{11}H_{12}Cl_2N_2OS$: C, 45.35; H, 4.16; N, 9.62; Cl, 24.35. Found: C, 45.58; H, 3.97; N, 9.60; Cl, 24.0.

*Example XVII.—DL - 1,3' - diacetyl - 5 - bromo - 3',4', 5',6' - tetrahydrospiro(indoline - 3,2' - [2H - 1,3]-thiazin)-2-one*

5 - bromo - 3',4',5',6' - tetrahydrospiro(indoline - 3,2'-[2H1,3]-thiazin)-2-one hydrochloride (3.36 g., 0.010 m.) is added to a mixture of acetic anhydride (5 cc.) and pyridine (5 cc.). After the initial exothermic reaction, the mixture is stored at room temperature for 48 hours, then poured onto ice (ca. 50 g.). The product separates as a colorless solid which is collected by filtration, washed with water, dried at 50° C./house vac.; yield, 3.4 g. (100%), M.P. 207–209° C. (uncorr.). Recrystallization of the crude product from absolute ethanol (Darco G–60) gives the title compound (3.30 g., 96.8%), colorless needles, M.P. 209–210° C. (uncorr.).

Analysis.—Calcd. for $C_{15}H_{15}BrN_2O_3S$: C, 47.12; H, 3.96; N, 7.32; Br, 20.91. Found: C, 47.00; H, 3.87; N, 7.59; Br, 20.4.

*Example XVIII.—DL - 3' - carbamoyl - 5 - fluoro - 3',4', 5',6' - tetrahydrospiro(indoline - 3,2' - [2H] - 1,3]-thiazin)-2-one*

The reaction of 5 - fluoro - 3',4',5',6' - tetrahydrospiro-(indoline-3,2-[2H-1,3]thiazin)-2-one hydrochloride (2.75 g., 0.010 m.) with potassium cyanate in a manner similar to that of Example II yields the title compound (1.55 g. 57.8%), colorless prisms, M.P. 221.5° C. dec. (uncorr.).

Analysis.—Calcd. for $C_{12}H_{12}FN_3O_2S$: C, 51.23; H, 4.30; N, 14.94. Found: C, 51.55; H, 4.23; N, 15.06.

In the foregoing examples, the desired products, it will be noted, are prepared in the form of acid salts. It is of course understood that the free bases of such compounds are full equivalents for purposes of the present invention. Such free bases are prepared according to the procedure of the following example in which the hydrochloride product of Example IV is converted to the free base.

*Example XIX*

Sodium methylate (0.33 g., 0.006 m.) is added in small portions with vigorous stirring to a suspension of 5-bromo-3',4',5',6' - tetrahydrospiro(indoline - 3,2' - [2H - 1,3] thiazin)-2-one hydrochloride (2.00 g., 0.00596 m.) in absolute methanol (50 ml.). The mixture is concentrated in vacuo to dryness, and taken up in dry tetrahydrofuran. The insoluble material (NaCl) is separated by filtration. Concentration of the filtrate in vacuo yields 1.60 g. of solid, M.P. 164° C. dec. (uncorr.). Recrystallization from benzene affords colorless prisms, M.P. 176° C. dec. (uncorr.).

*Analysis.*—Calcd. for $C_{11}H_{10}BrN_2OS$: C, 44.15; H, 3.71; N, 9.36. Found: C, 44.90; H, 3.86; N, 9.27.

While the foregoing invention has been described with some degree of particularity in the specific example set forth above, it is to be understood that the invention in both its composition and process aspects is not so limited.

The invention claimed is:

1. A compound selected from the group consisting of those having the formula:

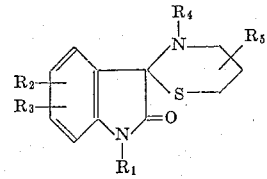

wherein $R_1$ is selected from the group consisting of hydrogen, lower alkyl, phenyl, benzyl, di(lower)alkylamino(lower)alkyl, lower alkanoyl and chloro(lower)alkanoyl; $R_2$ and $R_3$ are both selected from the group consisting of hydrogen, lower alkyl, phenyl, benzyl, di(lower)alkylamino(lower)alkyl, lower alkanoyl, chloro(lower)alkanoyl, halogen, hydroxy, nitro, lower alkoxy, lower alkoxycarbonyl, amino and carboxamido; $R_4$ is selected from the group consisting of hydrogen, lower alkyl and carbamoyl and $R_5$ is selected from the group consisting of hydrogen, lower alkyl, 2-thienyl, morpholino, pyrrolidino and piperazino.

2. DL - 3' - carbamoyl-3',4',5',6'-tetrahydrospiro(indoline-3,2'-[2H-1,3]thiazin)-2-one.

3. DL - 5 - methyl-3',4',5',6'-tetrahydrospiro(indoline-3,2'-[2H-1,3]thiazin)-2-one.

4. DL - 1 - methyl-3',4',5',6'-tetrahydrospiro(indoline-3,2'-[2H-1,3]thiazin)-2-one.

5. DL - 5 - bromo-1-methyl-3',4',5',6'-tetrahydrospiro(indoline-3,2'-[2H-1,3]thiazin)-2-one.

6. DL - 1 - phenyl-3',4',5',6'-tetrahydrospiro(indoline-3,2'-[2H-1,3]thiazin)-2-one.

7. DL - 5 - nitro-3',4',5',6'-tetrahydrospiro(indoline-3,2'-[2H-1,3]thiazin)-2-one.

8. DL - 1,5 - dimethyl-3',4',5',6'-tetrahydrospiro(indoline-3,2'-[2H-1,3]thiazin)-2-one.

9. DL - 5 - bromo-3',4',5',6'-tetrahydrospiro(indoline-3,2'-[2H-1,3]thiazin)-2-one.

10. DL - 5 - fluoro-3',4',5',6'-tetrahydrospiro(indoline-3,2'-[2H-1,3]-thiazin)-2-one.

11. The process for preparing a 3',4',5',6'-tetrahydrospiro(indoline-3,2'-[2H-1,3]thiazin) - 2 - one comprising condensing an isatin with a 3-mercaptopropylamine.

12. The process of claim 11 wherein the isatin is substituted at the 5-position with a member of the group consisting of halogen, lower alkyl, nitro, amino and lower carboxylic acyl.

13. The process of claim 11 wherein the isatin is substituted at the 1-position with a member of the group consisting of lower alkyl, phenyl, phenyl alkyl and lower carboxylic acyl.

References Cited by the Examiner

Cook et al.: J. Chem. Soc. (1949), pp. 30007–12.

WALTER A. MODANCE, *Primary Examiner.*

JOHN M. FORD, *Assistant Examiner.*